(12) United States Patent
Stafford

(10) Patent No.: US 9,102,557 B2
(45) Date of Patent: Aug. 11, 2015

(54) CHLORINATION DEVICE

(75) Inventor: Ulick Stafford, County Wexford (IE)

(73) Assignee: MEDENTECH LIMITED, Wexford (IE)

( * ) Notice: Subject to any disclaimer, the term of this patent is extended or adjusted under 35 U.S.C. 154(b) by 531 days.

(21) Appl. No.: 13/390,775

(22) PCT Filed: Aug. 18, 2010

(86) PCT No.: PCT/IE2010/000051
§ 371 (c)(1),
(2), (4) Date: Feb. 16, 2012

(87) PCT Pub. No.: WO2011/021173
PCT Pub. Date: Feb. 24, 2011

(65) Prior Publication Data
US 2012/0152813 A1    Jun. 21, 2012

Related U.S. Application Data

(60) Provisional application No. 61/272,123, filed on Aug. 18, 2009, provisional application No. 61/344,102, filed on May 25, 2010.

(51) Int. Cl.
*C02F 1/68* (2006.01)
*C02F 1/76* (2006.01)
(Continued)

(52) U.S. Cl.
CPC .............. *C02F 1/688* (2013.01); *B01F 1/0022* (2013.01); *C02F 1/006* (2013.01); *C02F 1/76* (2013.01); *C02F 2209/40* (2013.01)

(58) Field of Classification Search
CPC .......... C02F 1/006; C02F 1/687; C02F 1/688; C02F 1/76; B01F 1/0022; B01F 1/0027; B01F 3/12; B01F 2001/0055; B01F 2001/0061; B01F 2003/125
See application file for complete search history.

(56) References Cited

U.S. PATENT DOCUMENTS 3,495,948 A * 2/1970 Long et al. .................... 422/276
5,076,315 A * 12/1991 King ............................. 137/268
5,089,127 A    2/1992 Junker
(Continued)

FOREIGN PATENT DOCUMENTS

JP    H06-11832    2/1994
WO    01/03796     1/2001

OTHER PUBLICATIONS

International Search Report dated Dec. 22, 2010.
(Continued)

*Primary Examiner* — Lucas Stelling
(74) *Attorney, Agent, or Firm* — Jacobson Holman, PLLC.

(57) ABSTRACT

An un-pressurized chlorination device comprises a container having an open top closed by a removable lid. The container defines an inner chamber for a plurality of chlorination tablets. The container has a lower inlet spigot for receiving a water supply inlet pipe. The container also has a lower water outlet through which chlorinated water is delivered. There is a water flow path between the inlet and the outlet. The tablet chamber is not pressurized and the outlet discharges to atmosphere pressure. The device of the invention is useful for dissolving, dispersing and dispensing soluble material in tablet form into a liquid. There is a substantially horizontal fluid path with just enough fall to the outlet to allow the device to drain down out of the outlet when there is no inlet flow.

20 Claims, 15 Drawing Sheets

(51) Int. Cl.
      *B01F 1/00*       (2006.01)
      *C02F 1/00*       (2006.01)

(56)            References Cited

U.S. PATENT DOCUMENTS 5,427,748 A  *  6/1995   Wiedrich et al. .............. 422/284
    5,447,641 A  *  9/1995   Wittig ........................... 210/756
    5,637,230 A     6/1997   Billings
    5,810,043 A     9/1998   Grenier
    6,138,703 A    10/2000   Ferguson
    8,075,769 B1 * 12/2011   Gleason et al. ............... 210/206
    2002/0153043 A1 10/2002  Hillyard
    2005/0211613 A1  9/2005  King

OTHER PUBLICATIONS

European Examination Report issued on Feb. 10, 2014, to a corresponding European Patent Application 10 752 633.7-1352.
Australian Examination Report issued May 2, 2014, to a corresponding Australian Patent Application 2010286025.
Japanese Office Action issued on Jul. 11, 2014, to a corresponding Japanese Patent Application 2012-525246.

* cited by examiner

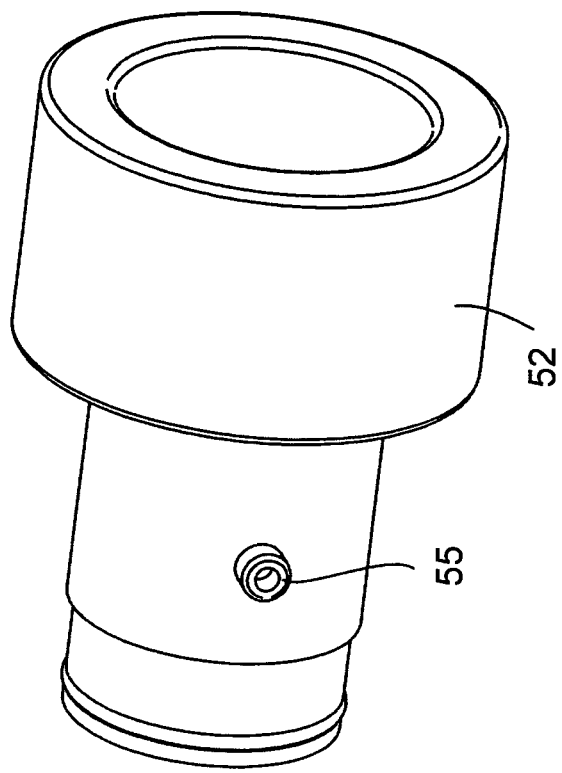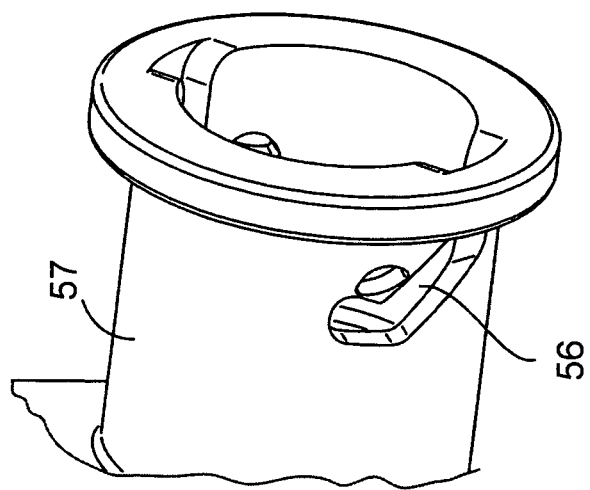
Fig. 21

CHLORINATION DEVICE

This is a national stage of PCT/IE10/000051 filed Aug. 18, 2010 and published in English, claiming the benefit of U.S. provisional application No. 61/272,123, filed Aug. 18, 2009, and the U.S. provisional application No. 61/344,102, filed May 25, 2010, hereby incorporated by reference.

The present invention relates to a device used to chlorinate water to make it potable. The device may also be used to chlorinate waste water, cooling tower water and swimming pool water. The device may also be used to dissolve other materials, which may be in a tablet form, into a liquid.

In many parts of the world a plumbed water supply may not be safe to drink because of microbial contamination. Sometimes water in municipal schemes is not disinfected or the amount of disinfectant added may not be sufficient to provide residual protection to the water to prevent microbial recontamination. In other cases water may be piped directly from a river or other surface source or a well as part of a small local water supply scheme with no disinfection. In other cases farms, businesses or dwellings may have an individual water supply, either surface or ground or collected rain water that is microbially suspect. In other cases, such as intensive agricultural units, it may be desirable to chlorinate water to provide residual protection to prevent the water contaminated by a sick animal spreading the disease to others through the water supply. For these and other reasons it is desirable to add a small amount of disinfectant to water.

There are many devices available to add disinfectant to water on a continuous basis. These devices are included as part of water treatment plants and can be based on halogen, ozone, UV or other technology. Halogen systems can be based on chlorine, bromine or iodine. Chlorination systems can be based on chlorine gas, liquid chlorine such as sodium hypochlorite solution or solid chlorine sources. Solid chlorine sources use materials such as calcium hypochlorite, trichloroisocyanuric acid, sodium dichloroisocyanurate etc., to provide chlorine. Such in-line chlorination devices are pressurised. One of the problems with such systems is that when flow is turned off water is retained in the device leading to problems of degradation of the chlorine source. Further, when flow is re-commenced, an initial slug of water with a high chlorine content is delivered to the outlet. Such a concentrated slug is undesirable.

This invention is directed towards providing an improved device particularly for chlorination.

STATEMENTS OF INVENTION

According to the invention there is provided a device for dissolving, dispersing and dispensing soluble material in a solid form into a liquid flowing through the device, the device comprising a container having an inlet and an outlet for flow of liquid through the device at the bottom end of the container, and means for directing liquid flowing from the inlet to the outlet into contact with the solid material housed in the container, the top of the container being open to atmospheric pressure. In one case the outlet discharges to atmospheric pressure.

In one embodiment there is a defined flowpath between the inlet and the outlet which is adapted for contacting liquid with tablets housed in the container.

The flowpath may comprise a pipe having an opening in the wall thereof for contacting liquid with tablets. The opening may extend longitudinally along the wall of the pipe.

In one embodiment the device comprises an adjustment means for adjustment of the amount of material dissolved in water flowing through the device. The adjustment means may comprise an obstruction for flowpath. In one case the flowpath comprises a pipe and the obstruction is movable relative to the pipe.

In one embodiment the obstruction is movable from a retracted position in which the obstruction does not obstruct the flowpath and an extended position in which the obstruction extends into the flow path to partially obstruct the flow path.

The obstruction may be rotatably mounted for movement between retracted and extended configurations. In one case the obstruction comprises a screw which may be rotatably mounted in a wall of the pipe.

In one embodiment the device comprises an access housing for accessing the obstruction. The access housing may extend through the container.

In one case the container comprises a chamber for reception of tablets, the chamber being separated from the access housing by a dividing wall. There may be an opening between the dividing wall and the top of the chamber to maintain the chamber at atmospheric pressure.

In one embodiment the inlet and outlet are arranged substantially co-axially.

In one case the container has an opening to the atmosphere. The opening may be a top opening. The top opening may be covered by a loose fitting lid.

In one embodiment the inlet is adapted for coupling with a water supply pipe.

In one case the soluble material in a solid form comprises a tablet. The tablet may contain a source of chlorine.

In one embodiment the cross sectional area of the container at a lower part of the device is less than a cross-sectional area at an upper part of the device.

The outlet is preferably downwardly directed. Preferably the outlet comprises an expansion. The outlet may have a deflecting wall. The angle subtended between the deflecting wall and the vertical may be approximately 45°.

The outlet may be integral with the container. The device may be integrally moulded in one shot.

In one aspect there is provided a device for dissolving, dispersing and dispensing soluble material in a tablet form into a liquid flowing through the device, the device comprising a container having a top and a bottom, the container having an inlet and an outlet for flow of liquid through the device at the bottom end of the container, and means for directing liquid flowing from the inlet to the outlet into contact with tablets housed in the container.

In one embodiment there is a defined flowpath between the inlet and the outlet which is adapted for contacting liquid with tablets housed in the container. The flowpath may comprise a pipe having an opening in the wall thereof for contacting liquid with tablets. The opening may extend longitudinally along the wall of the pipe.

In one embodiment the device comprises a level adjustment means. The level adjustment means may comprise a movable obstruction in the flowpath.

In one embodiment the inlet and outlet are arranged substantially co-axially.

In one case the tablet comprises a source of chlorine.

In one embodiment the top of the container is smaller than the bottom of the container.

In one aspect the invention provides a device for dissolving, dispersing and dispensing soluble material in tablet form into a liquid, the device having a substantially horizontal inlet at one end which may connect to the outlet of ballcock or other valve, and a substantially horizontal or expanding vertical downwards outlet at the other end discharging at atmospheric pressure, and whose horizontal fluid path has substantially the same cross sectional area as the inlet, and which has openings that allow a small amount of water to mix into the main tablet chamber which surrounds the fluid path and to completely drain the chamber when the flow is turned off, and which has an adjustable restriction to the fluid flow to allow the pressure drop across the device to be adjusted thereby varying the amount of fluid which flows into the chamber which rises vertically above the fluid path and is open to atmosphere with just a loose cover to keep out rain if used outdoors, and which may have a reducing cross sectional area higher in the device.

The invention provides a device which adjusts the amount of disinfectant added proportional to the flow to ensure a similar level of disinfectant. The device does not require electricity to control metering. The device drains down when there is no flow and therefore ensures that solid disinfectant does not continue to dissolve. The device is vented to prevent a build up of dangerous fumes. The device is readily adjusted to change the amount of disinfectant added. The device is small so that it can be easily mounted on a ballcock fill valve, often used on gravity tanks, or on a water dispensing tap. The device discharges at zero pressure head to ensure constant operation. The device is easily inspected without shutting down to see if it needs recharging. The device can discharge water downwards to make it easier to fill a tank or water container.

BRIEF DESCRIPTION OF THE DRAWINGS

The invention will be more clearly understood from the following description thereof given by way of example only, in which:—

FIG. 21 is an exploded isometric view of an inlet of the device of FIGS. 16 to 20;

DETAILED DESCRIPTION

Figure 1:
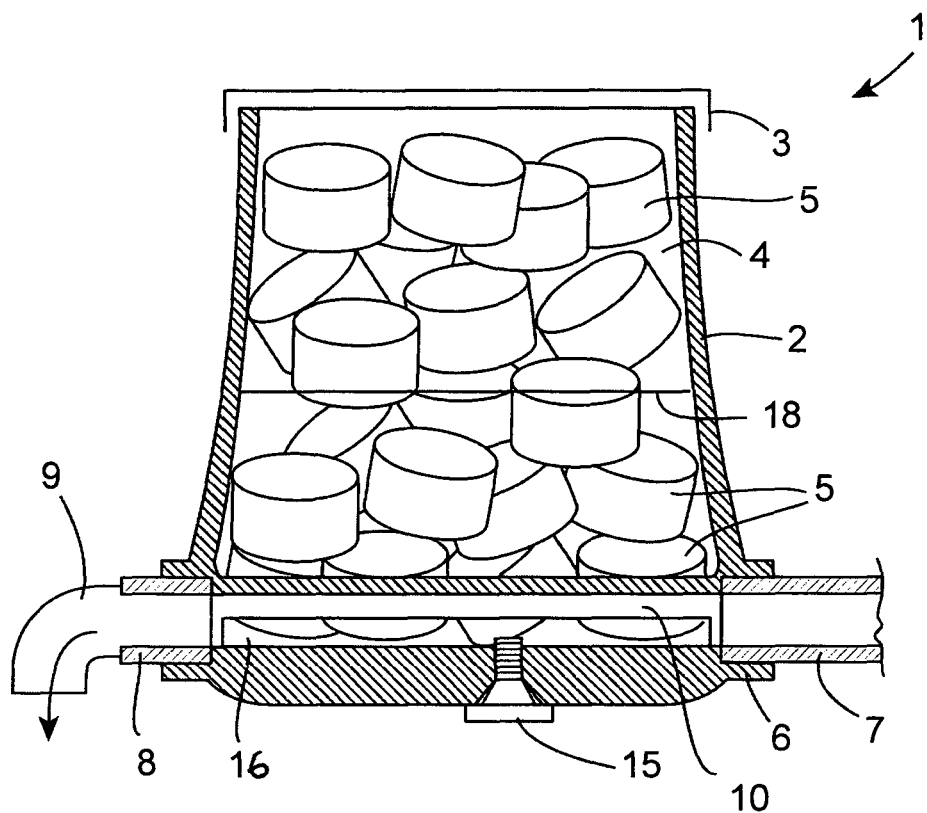
FIG. 1 is a cross sectional view of a device of the invention.
Figure 2:
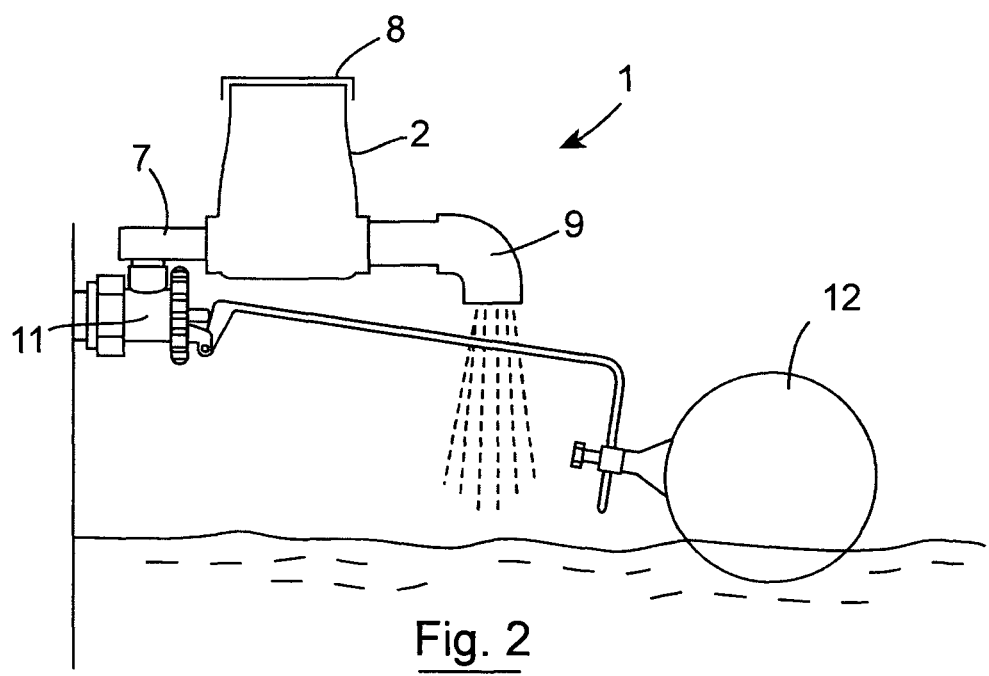
FIG. 2 is an elevational view of the device, in use.
Figure 3:
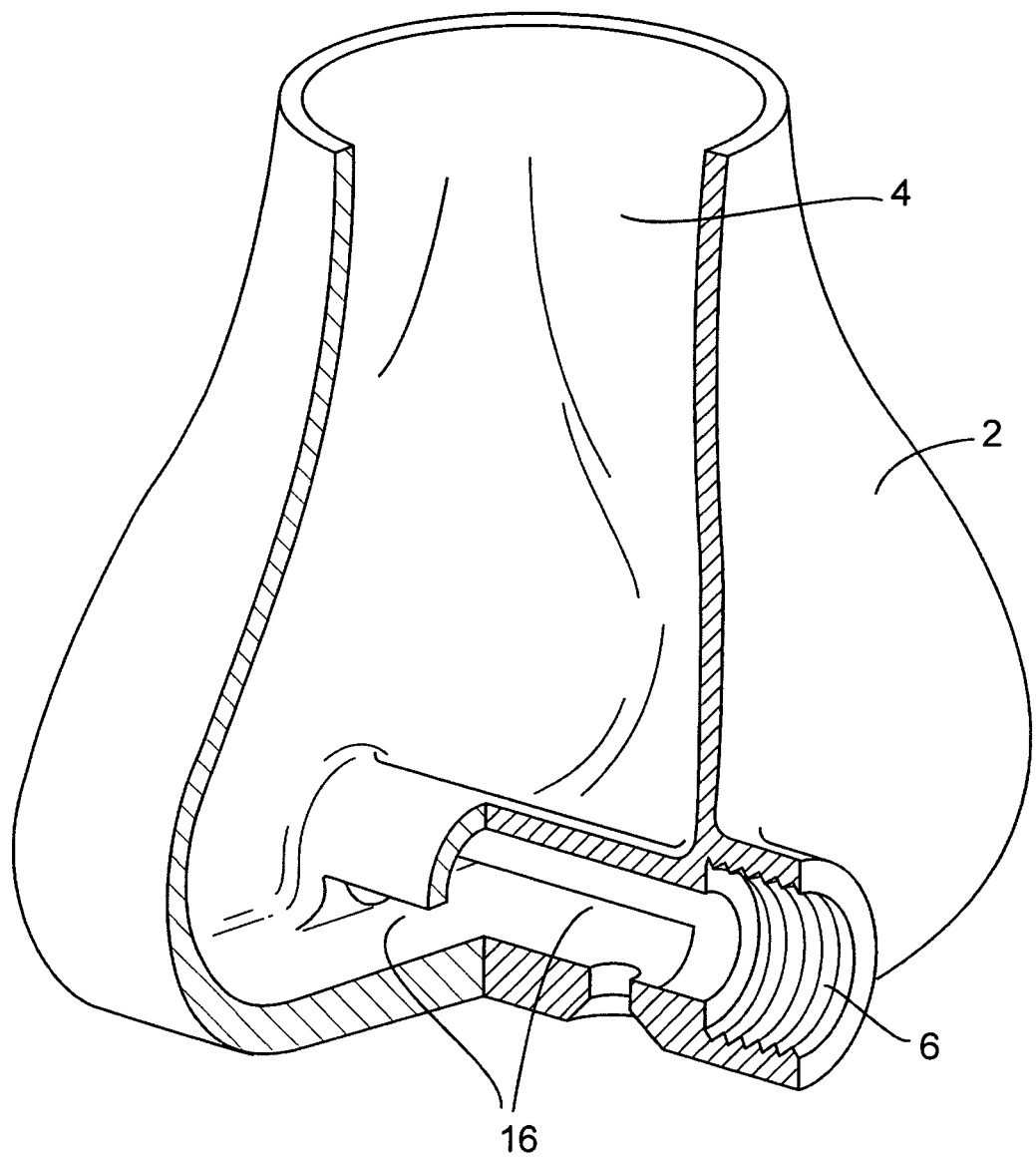
FIG. 3 is an enlarged isometric, partially cut-away cross sectional view of a container forming part of the device of FIGS. 1 and 2.

Referring to FIGS. 1 to 3 a chlorination device 1 of the invention comprises a container 2 having an open top closed by a removable lid 3. The container 2 defines an inner chamber 4 for a plurality of chlorination tablets 5. The container 2 has a lower inlet spigot 6 for receiving a water supply inlet pipe 7. The container 2 also has a lower outlet spigot 8 for receiving a water outlet pipe 9 through which chlorinated water is delivered. There is a water flow path 10 between the inlet 6 and the outlet 8. The flow of water from the outlet pipe 9 may be controlled by a suitable valve 11, the operation of which may be controlled by a ballcock 12.

The inlet 6 is substantially horizontal. The outlet 8 may also be substantially horizontal or may connect with an outlet pipe 9 which may expand outwardly and/or downwardly. The outlet 9 discharges to atmospheric pressure. The device is an end of line device. It is located at the end of a water supply.

The device of the invention is useful for dissolving, dispersing and dispensing soluble material in tablet form into a liquid. There is a substantially horizontal fluid path 10 with just enough fall to the outlet 8 to allow the device to drain down out of the outlet pipe 9 when there is no inlet flow.

The horizontal fluid path 10 has substantially the same cross sectional area as the inlet 6, and has openings 16 that allow a small amount of water to mix into the main tablet chamber 4 which surrounds the fluid path 10 and to completely drain the chamber 4 when the flow is turned off.

The device has an adjustable restriction to the fluid flow, such as a screw 15, to allow the pressure drop across the device to be adjusted. The fluid in the chamber 4 rises vertically above the fluid path 10. The device is open to atmosphere with just the loose cover 3 to keep out rain if used outdoors, and which may have a reducing cross sectional area higher in the device. The reduction of cross sectional area higher in the device allows the tablets 5 to fall down to the bottom easily without being obstructed. Since the fluid flow is proportional to the square of the pressure drop it is desirable to reduce the cross sectional area of the device higher in the device to keep the amount of tablets immersed in water nearly in proportion to the flow rate. A cylindrical extension may be added to the tablet inlet at the top of the container 2 to allow more tablets to be loaded into the device.

In operation, the device is connected to a flowing liquid source. The flow may be controlled by a ballcock valve, a manual valve or a flow controller such as an electronic valve operated by an electronic float or a timer upstream of the device. The device itself is not under any back pressure and both the outlet and tablet chamber 2 are open to atmosphere Patm. The open tablet chamber 2 allows venting of potentially dangerous fumes that can form when tablets such as TCCA trichloroisocyanuric acid are wetted. Most flow goes straight through the device but a small amount flows into the tablet chamber 2. There are openings 16 of a suitable size between the through pipe and the tablet chamber to allow approximately the correct amount of the tablet material to dissolve.

The opening 16 may take the form of holes or slot(s) and are designed in such that all liquid will drain down from the device and out the outlet 8 when there is no flow into the device. The amount of water that flows into the chamber 4 and hence the amount of material that dissolves can be adjusted by changing the size of a restriction or obstruction which may take the form of a screw 15 in the bottom of the device. When the restriction is increased the pressure drop across the device increases and the level 18 to which the fluid fills the chamber 2 rises. This allows more tablet material to dissolve. If the flow increases the level of liquid 18 will rise to a level proportional to the square of the flow. The cross sectional area of the chamber 4 can be reduced as the height increases such that the square of the flow is proportional to the total immersed volume of the chamber. If the device is to be operated at a set flow rate either on or off, or if the amount of chlorine added is not critical once it is within a range such a shape is not essential.

As the flow in the device reduces the level of liquid in the chamber 2 falls, thereby reducing the amount of tablets 5 immersed in the liquid. This ensures that the amount of tablet that is dissolved is similar to that which is dissolved when flow is fuller. When flow is shut off completely the device drains down and no tablets 5 are in contact with water. This ensures that the tablets do not further dissolve and allows them to dry out, prolonging the useful life of the tablets. This feature also ensures that when flow starts again after a time with no flow the first water through is not overdosed with chlorine as would be a case if the tablets were to sit in water when there is no flow.

The device may be further controlled and improved by adjusting the outlet. If an expanding bend 9 is added to the outlet 8 to turn the flow downwards this allows easier discharge to a tank or a vessel than would occur with horizontal discharge. It also allows the device to be more easily controlled for high flowrates. Because the discharge of a downward bend is lower than the base of the device, the pressure within can be lowered slightly below atmospheric pressure. This may allow air to mix with the fluid and makes it unlikely that the device would flood over, no matter how high the flow rate. The device can still be adjusted with the screw 15 and can be set to operate at a much higher flowrate. Thus, by design of the outlet it is possible to tune the device to control the amount of tablets dissolved. If the bend does not include an expansion, the restriction caused by a bend could cause an unacceptable backpressure on the device and cause it to flood.

Figure 4:
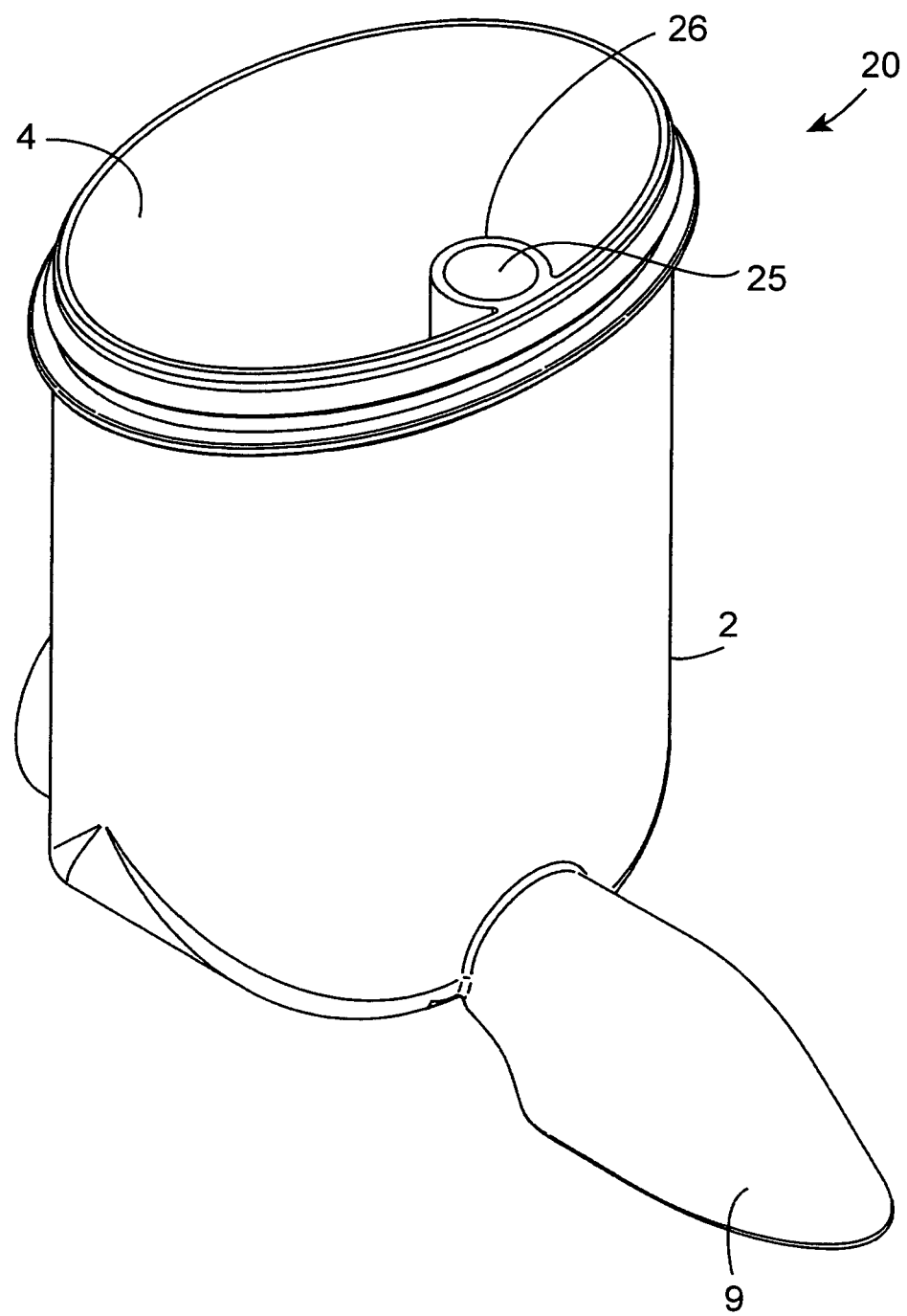
FIG. 4 is an isometric view of another device according to the invention.
Figure 5:
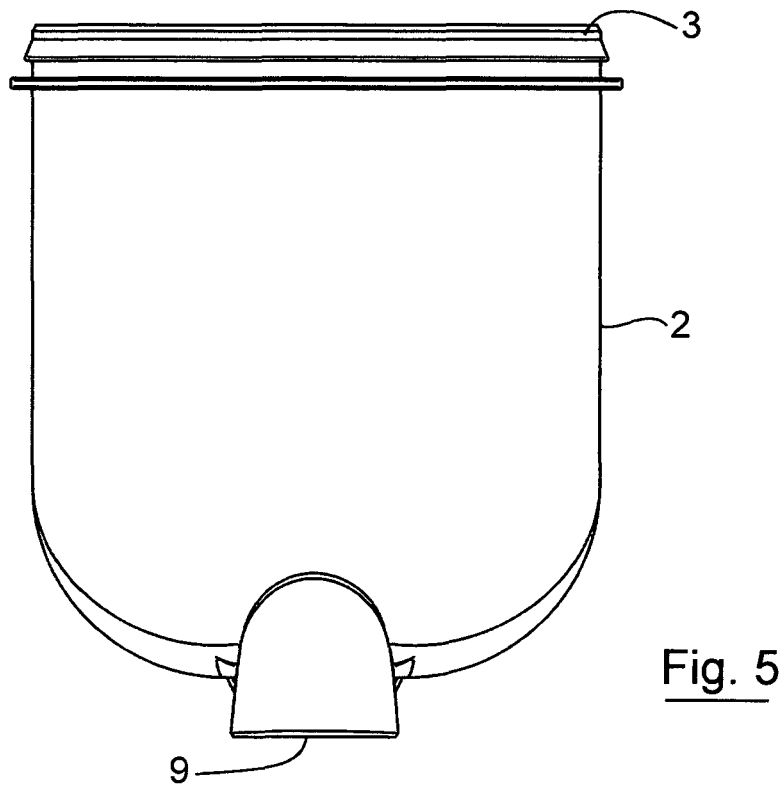
FIGS. 5 and 6 are end views of the device of FIG. 4.
Figure 6:
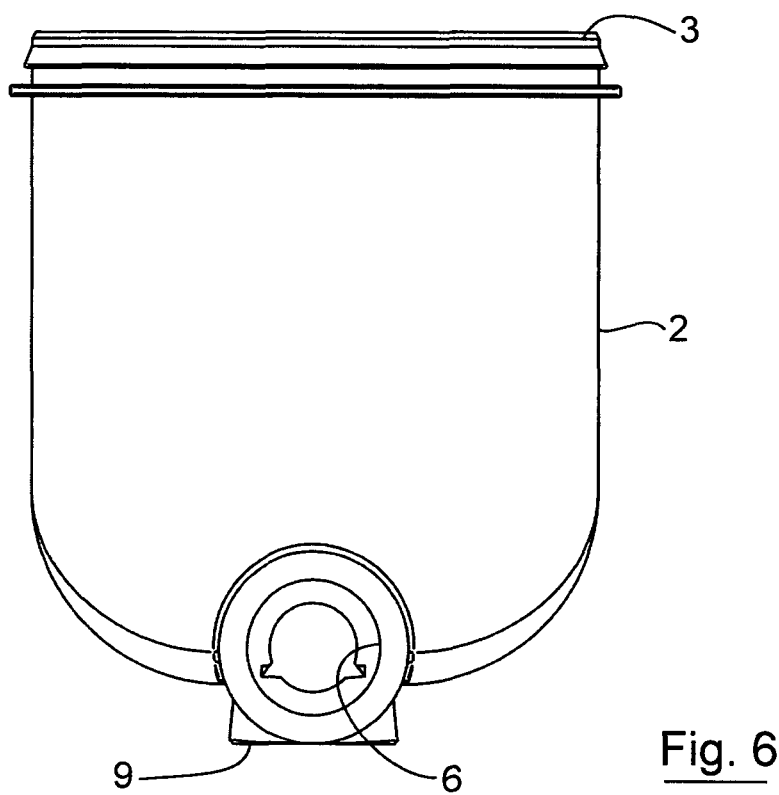
Figures 7, 10:
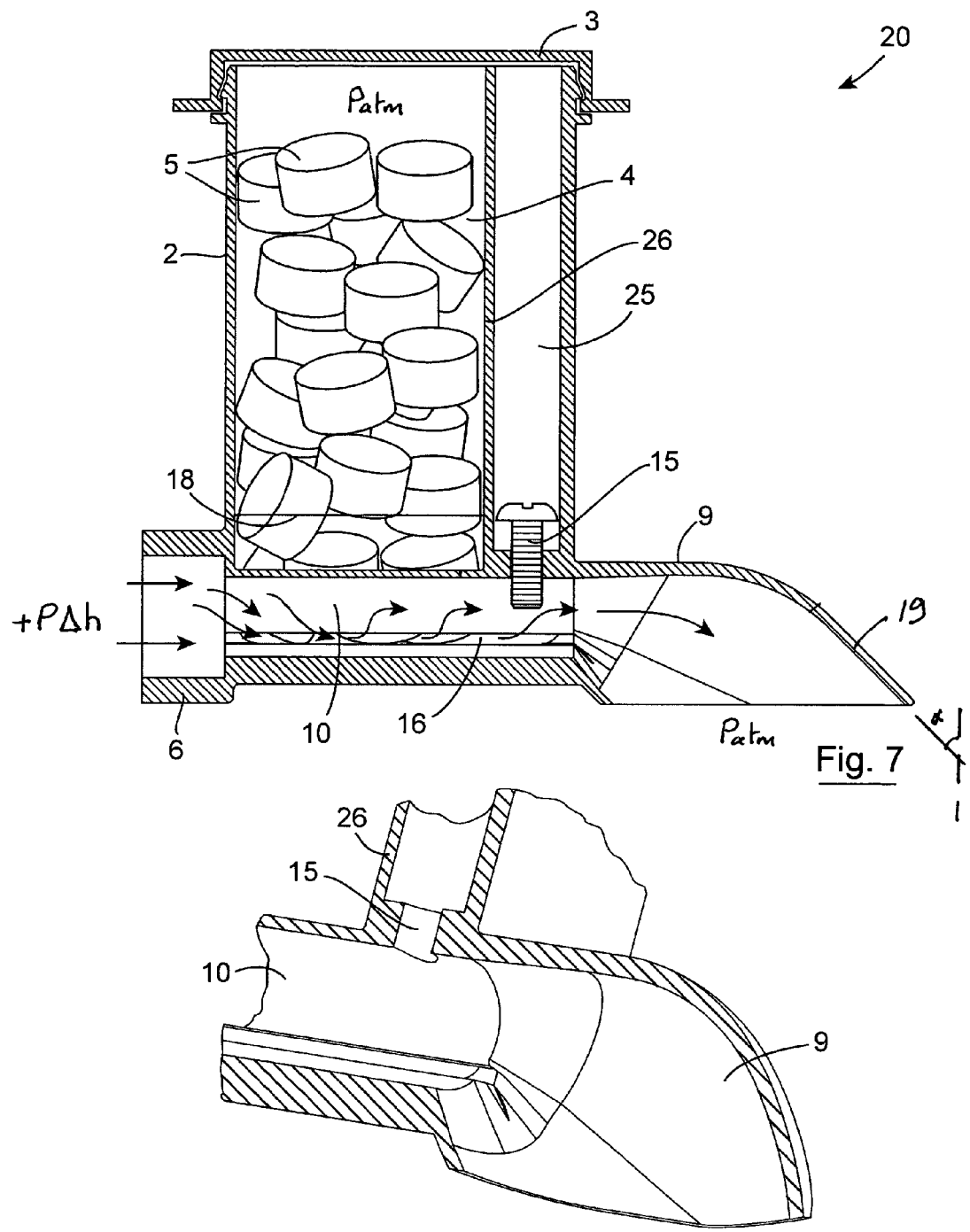
FIG. 7 is a transverse cross sectional view of the device of FIGS. 4 to 6, in use.
FIGS. 9 and 10 are isometric and cross sectional views of an outlet detail of the device of FIGS. 4 to 8.
Figure 8:
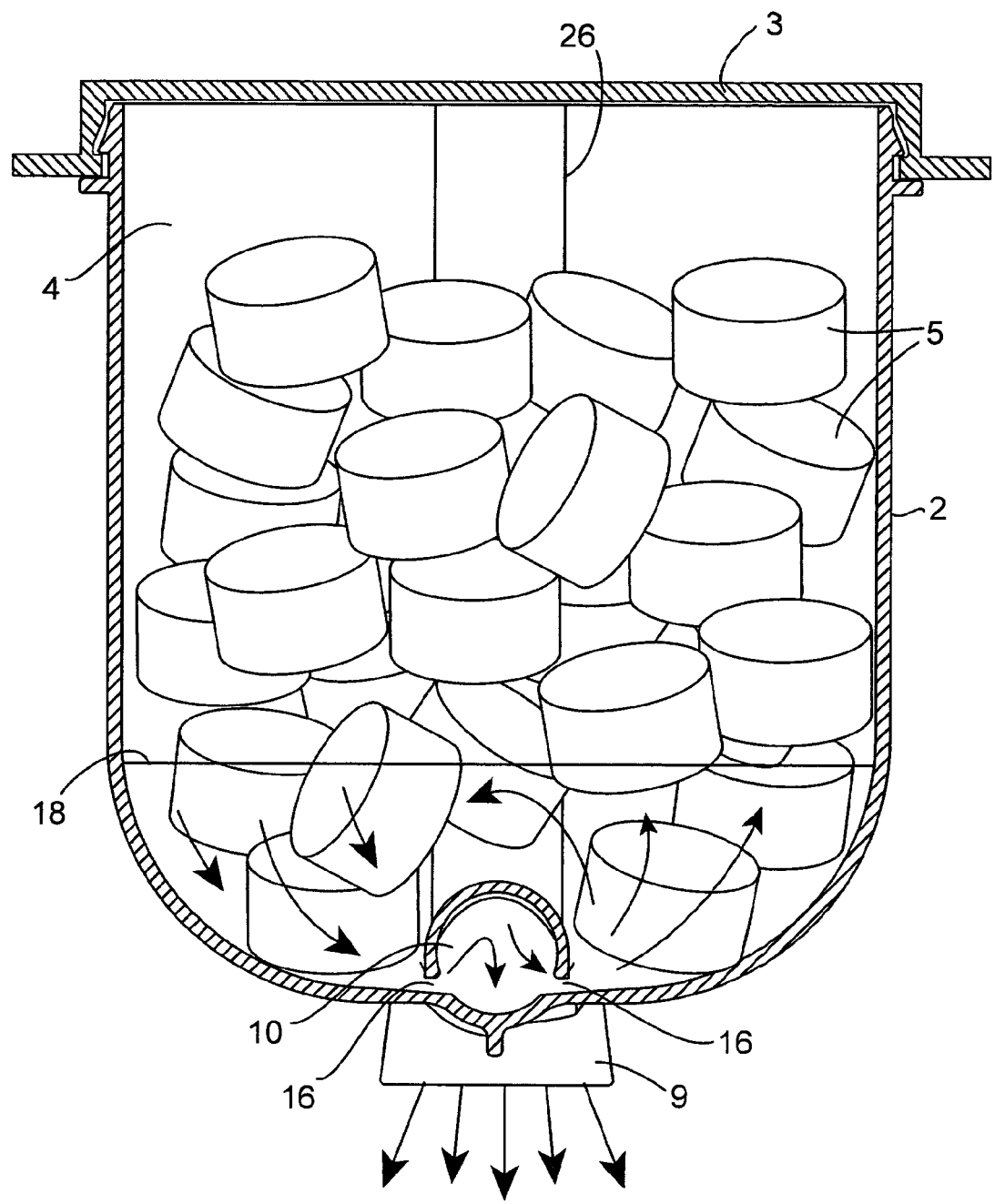
FIG. 8 is another cross sectional view of the device of FIGS. 4 to 6, in use.
Figure 9:
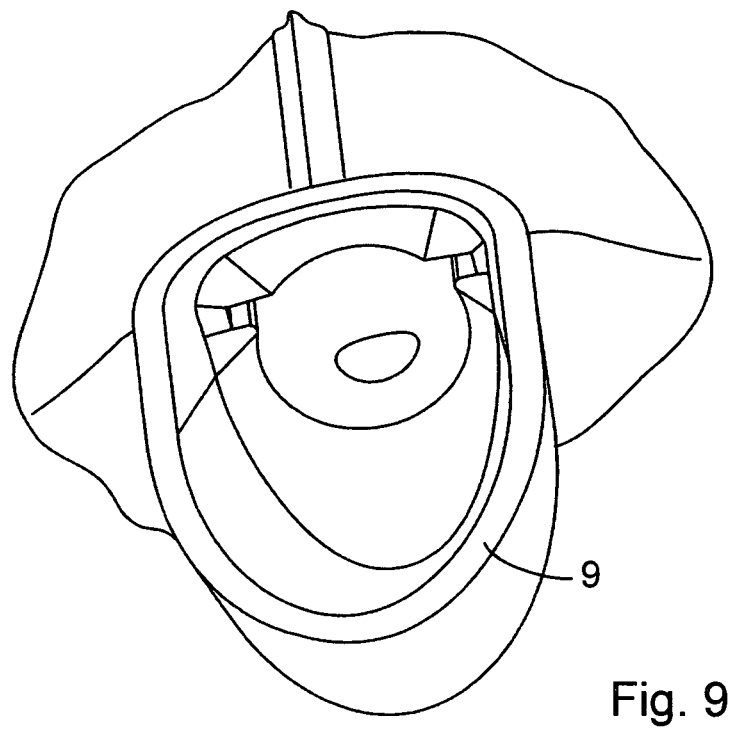
Figure 11:
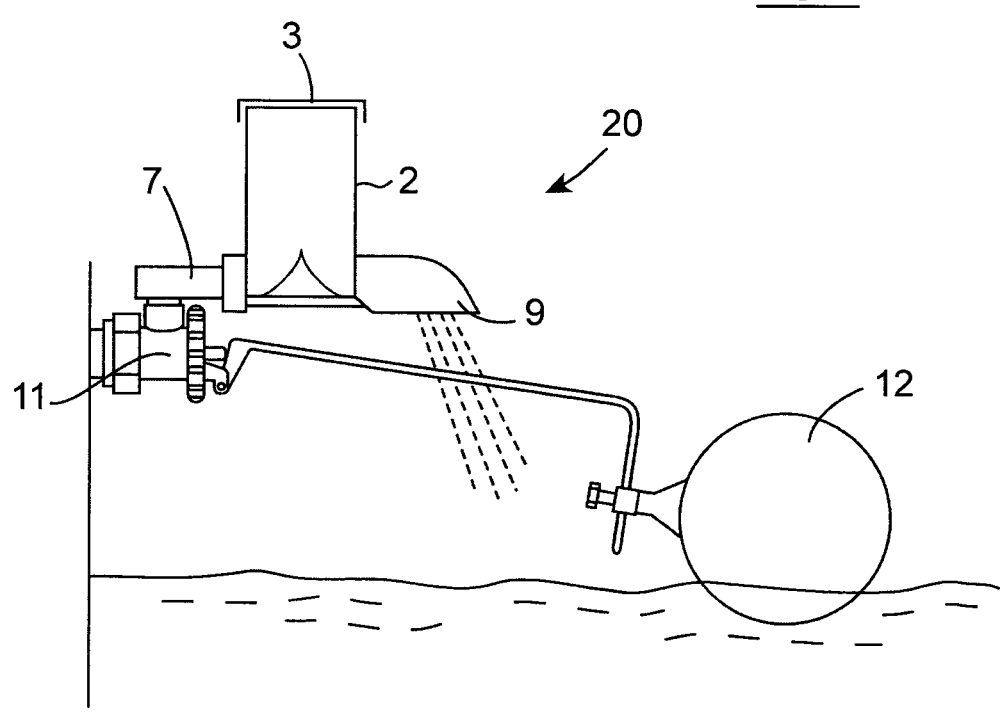
FIG. 11 is an elevational view of the device of FIGS. 4 to 10, in use.

The device shown in FIG. 4 can be injection moulded in a single shot. The outlet 9 is designed to be injection moulded as part of the device, discharge downwards and will not cause an unacceptable increase in backpressure on the device when operated with high flowrates. The adjustment screw 15 is positioned on the top of the flowpath at the bottom of cylindrical channel moulded into the device to allow easier adjustment in use. This channel can be covered by the loose cover 3 during normal operation.

The tablets 5 to be dissolved in the device may be any suitable size greater than the size of the opening 16 from the pipe to the chamber 4. They should be small enough to go in the top of the device and fall easily to the bottom floor of the chamber 4. The tablets 5 may be made of any suitable slowly dissolving material such as trichloroisocyanuric acid. The tablets 5 may be manufactured with other materials to slow down the rate of dissolution.

A typical slow dissolving tablet formulation for use in the device consists of 98% trichloroisocyanuric acid and 2% boric acid (Fi-CLOR Mini Tabs from Arch Chemicals, 15 g, 30 mm) or 14 g, 25 mm TCCA tablets from Clearon.

EXAMPLES

Example 1

The device shown in FIG. 3 was moulded from a nylon type material using selective laser sintering. The overall size is approximately 100 mm across by 50 mm long by 100 mm high. The passage 10 through the device is 12 mm in diameter and ends are machined out and threaded with ½" BSP Thread. There is a slot 11 5 mm high at the bottom of this pipe 10 which allows water to flow into the chamber 4. ½" ID piping 7 can be connected to the inlet 6. The outlet 8 is also threaded with ½" BSP and is fitted with a ½" to ¾" expanding nipple with ¾" bend 9 attached and pointing downwards. The hole in the bottom of the device is threaded with M8 threads and is fitted with a stainless steel M8 screw 15 of suitable length such as 16 mm.

The device is first operated without tablets 5 and the depth of water is measured in the device. Screw lengths of 12 mm or 16 mm are used to set a depth of around 30 mm for maximum flow of 1000 L/hour. Once set tablets 5 are added to the chamber 4. Even when the flow is varied the concentration of chlorine in the water remains relatively unchanged at 3-4 ppm.

Example 2

The device of Example 1 is attached to the outlet of ballcock valve shown in FIG. 2. The ballcock valve (Beta BS1212 from Beta Ballvalves Ltd, Wolverhampton, England) discharges upwards. A right angled custom part is threaded at the inlet with M12×1 thread of the ball valve to ½" BSP. The ballvalve with attached device is mounted in a tank much like that used as a gravity reservoir in household and farm water systems. The device is set up much as in Example 1. However, maximum flow rates through the orifice of the ballvalve are slower than in example 1. Nevertheless, when set up and filled with tablets as outlined in example 1 the amount of chlorine added to the water remains in the range 3-5 ppm no matter how much water is flowing though the ball valve.

Referring to FIGS. 4 to 15, there is illustrated another unpressurised chlorination device 20 according to the invention. Parts similar to those identified with reference to FIGS. 1 to 3 are assigned the same reference numerals.

In this case the housing 2 is a single piece including the downwardly directed discharge outlet 9 which may be formed by moulding, for example of a plastics material. The lid 3 may be transparent to facilitate visibility. The lid 3 is a loose fit to expose the container to atmospheric pressure. The flow path is provided by a pipe 10 which has longitudinally extending slots 16 therein to facilitate flow of water into the chamber 4. As illustrated particularly in FIG. 7 some of the water flowing through the pipe 10 passes through the slots 16 and into the chamber 4 where it mixes with water held up in the chamber, creating eddies which assist in dissolving the tablets 5. The water with dissolved chlorine then exits from the chamber 4 through the slots 16 and back into the pipe 10. Chlorinated water exits through the outlet 9. The device ensures that an appropriate level of chlorination is delivered into the water which exits through the outlet 9. The outlet 9 has a deflecting wall 19 which directs the flow of chlorinated water exiting from the device downwardly. The angle of the deflecting wall 19 is selected to minimise back-pressure. An angle α subtended between an axis of the dividing wall 19 and the vertical is typically about 45°. The device is particularly suitable for intermittent use and, when there is no flow of inlet water, water drains from the chamber 2. This avoids any water hold-up (sump) in the device which would otherwise dissolve the chlorination tablets 5 and provide an undesirable slug of highly chlorinated water when the flow is resumed.

In this case there is an adjustable restrictor or obstruction such as a screw 15. In this case the screw 15 is housed in a housing 25 within the container 2. The housing 25 is defined by a dividing wall 26. Access to the screw 15 is gained from above which facilitates ease of adjustment, in use. By adjusting the screw 15 the concentration of chlorine at the outlet 9 can be varied typically in the range of 0.5 ppm to about 4 ppm.

Figure 12:
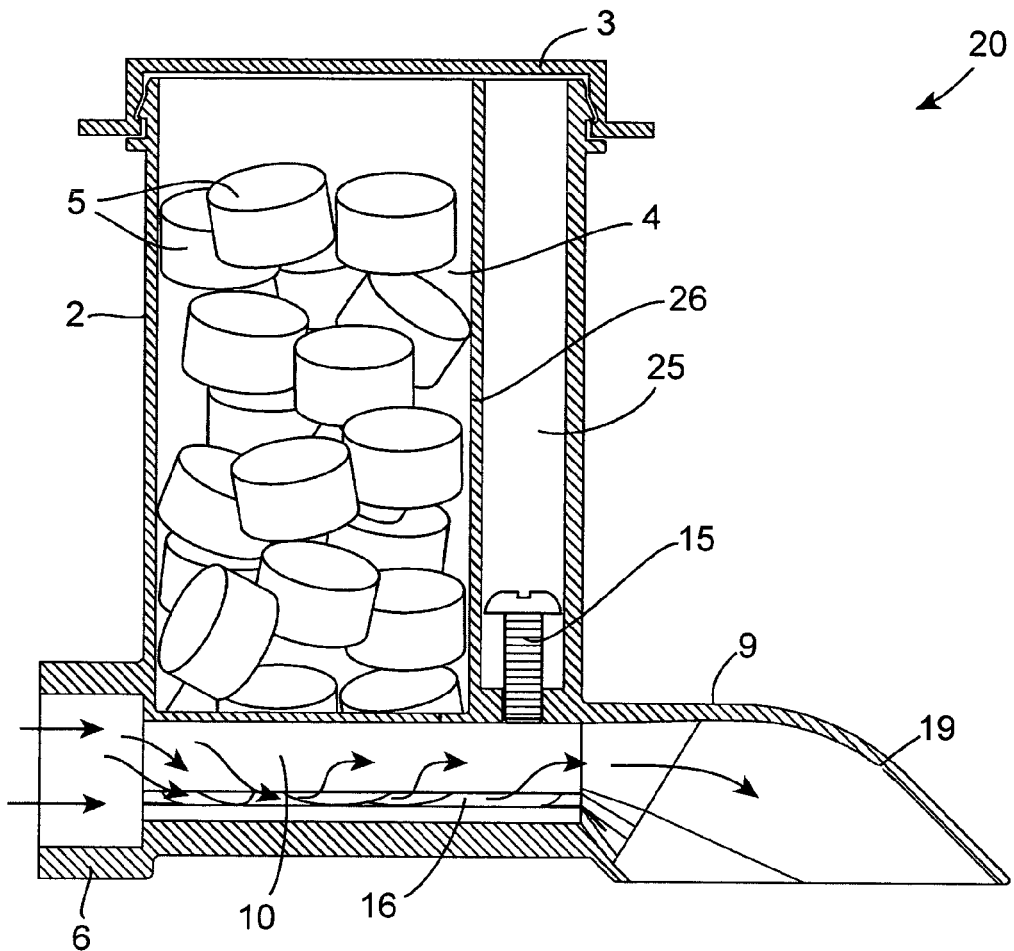
FIG. 12 is a transverse open sectional view of the device of FIGS. 4 to 6 in use with an adjustment screw in one position.
Figure 13:
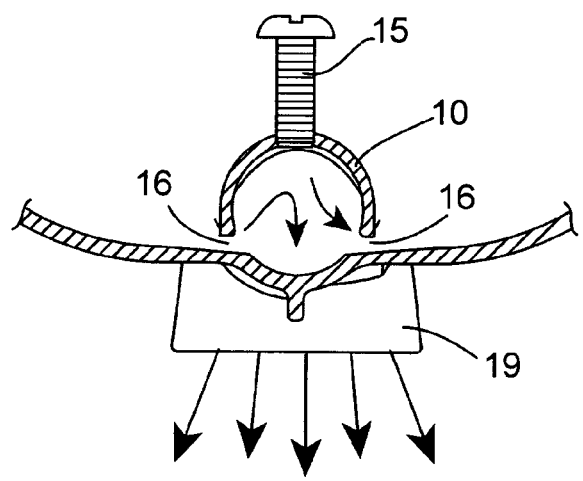
FIG. 13 is a cross sectional view of a part of the device of FIG. 12 illustrating the location of the screw.

FIGS. 12 and 13 illustrate the device with the adjustment screw 15 in a fully retracted position of use. In this configuration the hold up of water in the container is small and the amount of chlorine taken up by water flowing through the device is relatively small.

Figure 14:
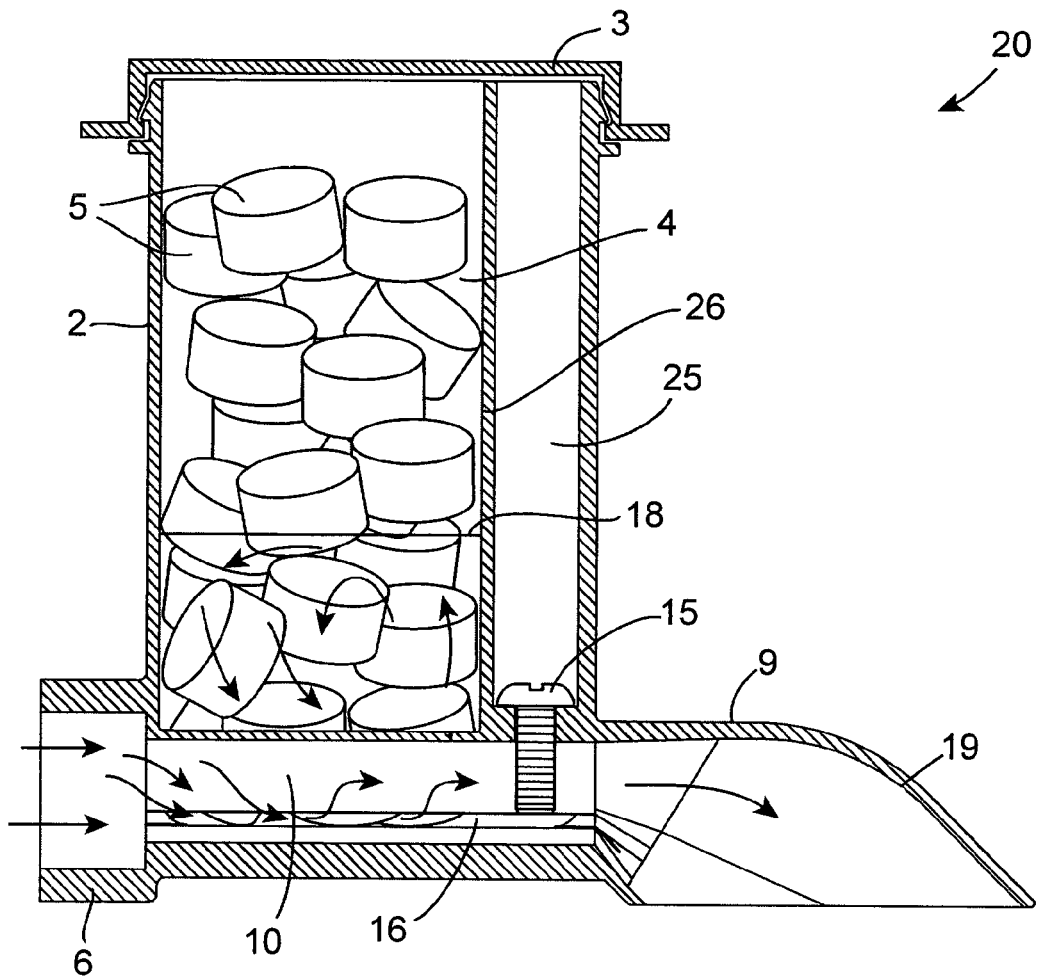
FIGS. 14 and 15 are views similar to FIGS. 12 and 13 with an adjustment screw in another position.
Figure 15:
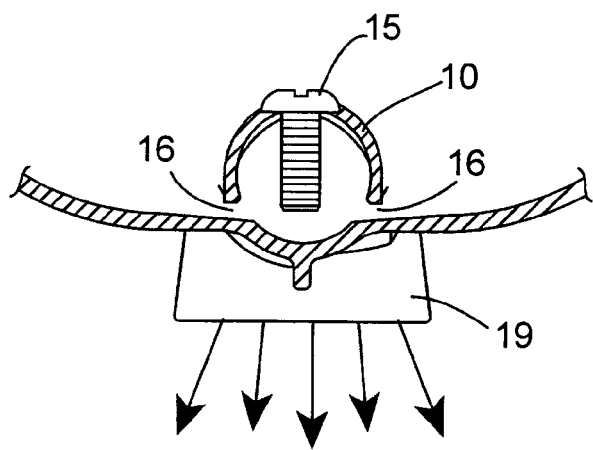
Figure 16:
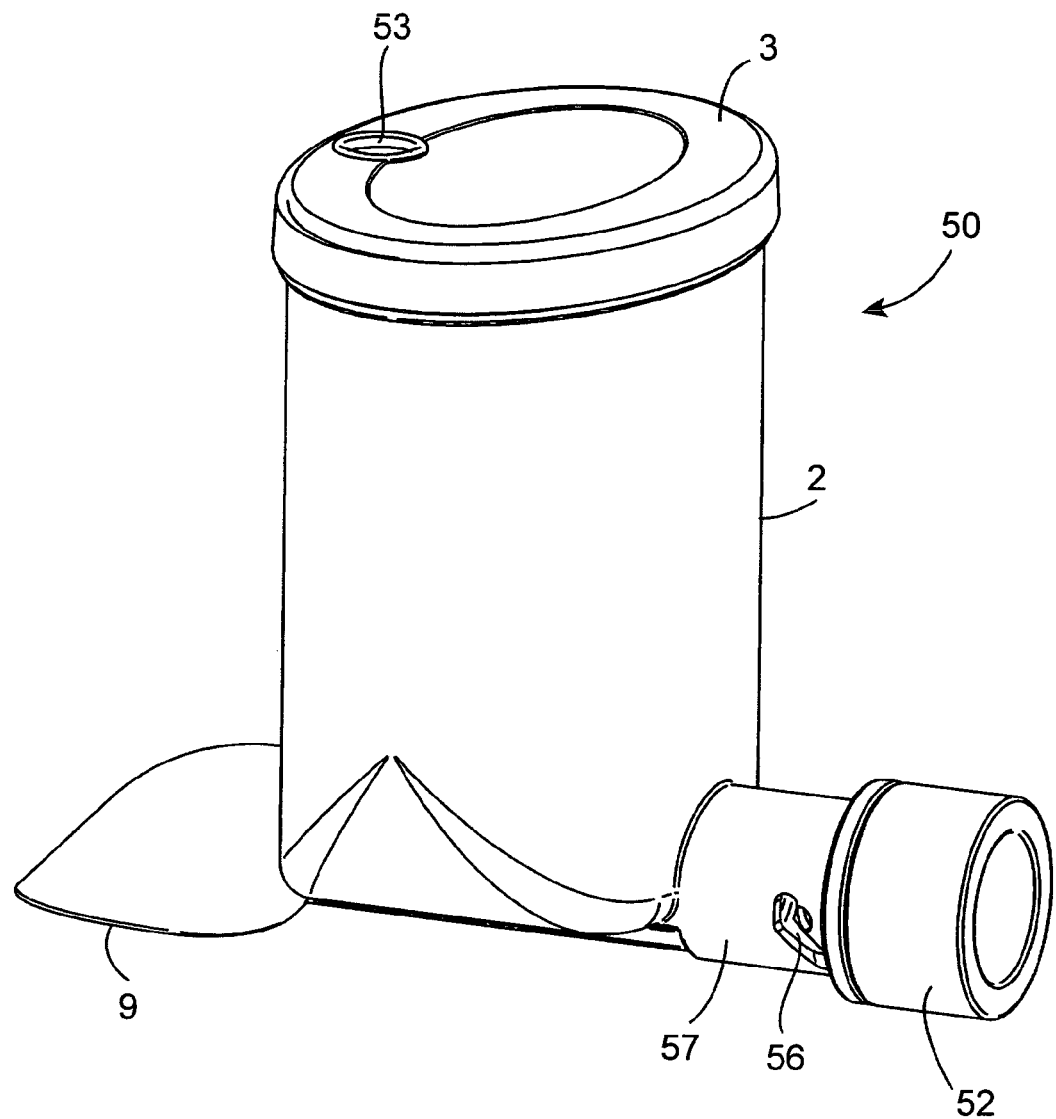
FIG. 16 is an isometric view of another device according to the invention.
Figure 17:
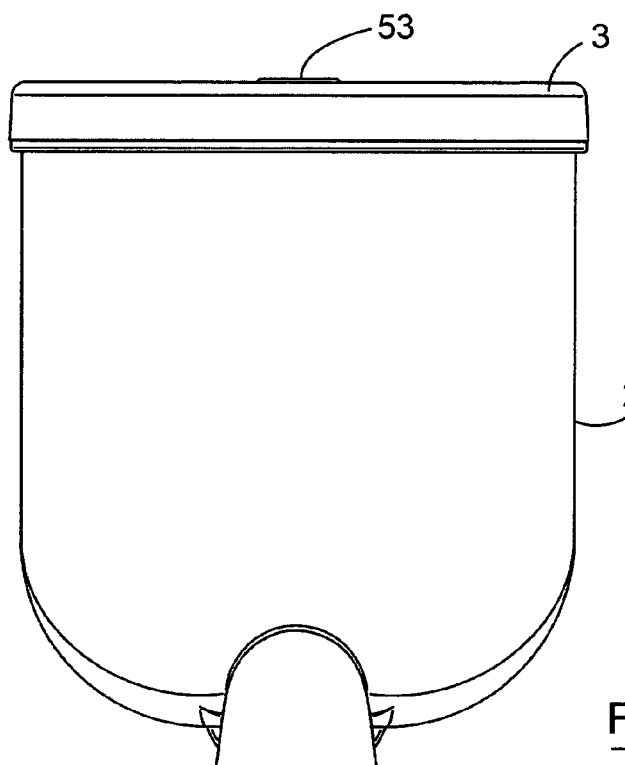
FIG. 17 is an end elevational view of the device of FIG. 16.
Figure 18:
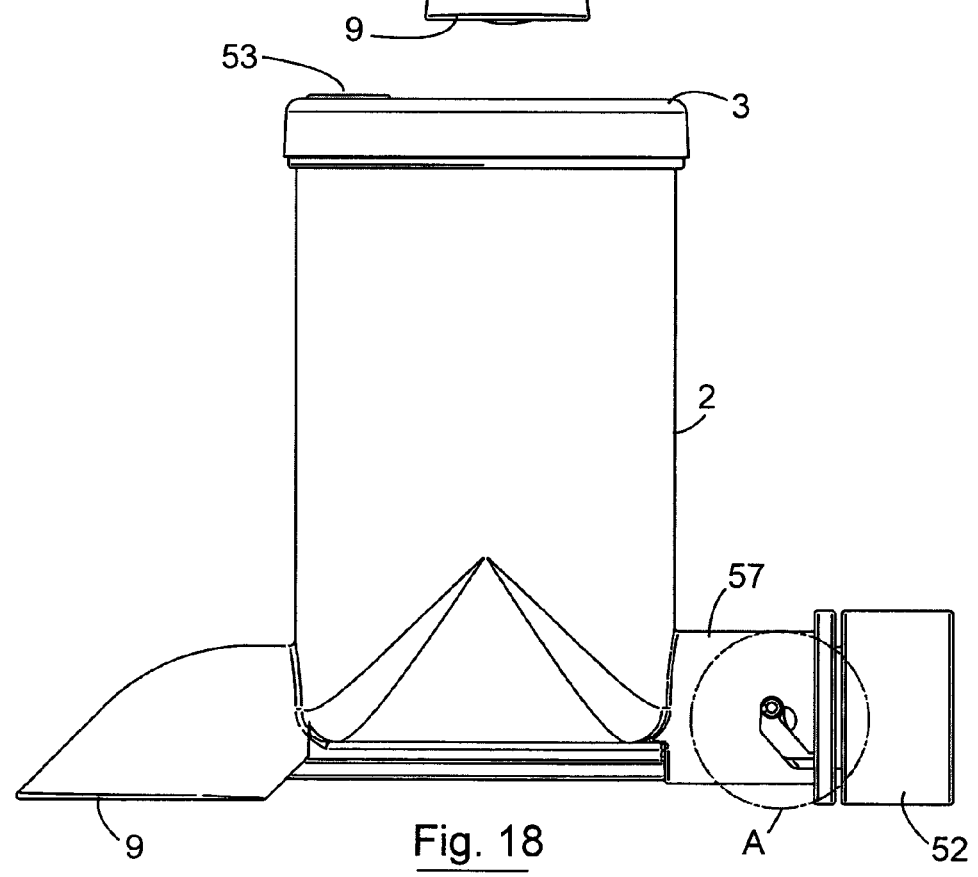
FIG. 18 is a side elevational view of the device of FIG. 16.
Figure 19:
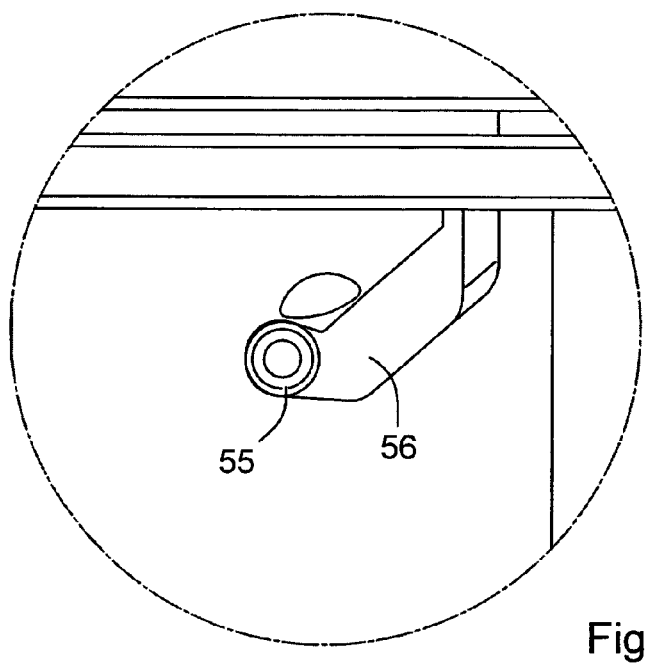
FIG. 19 is an enlarged view of detail A of FIG. 18.
Figure 20:
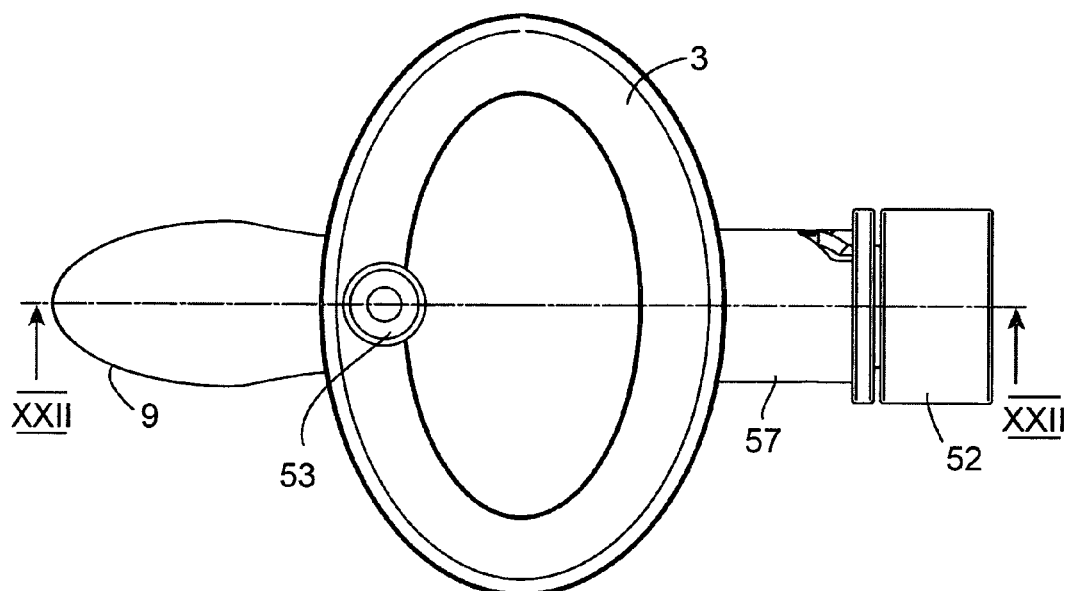
FIG. 20 is a top plan view of the device of FIG. 16.
Figure 22:
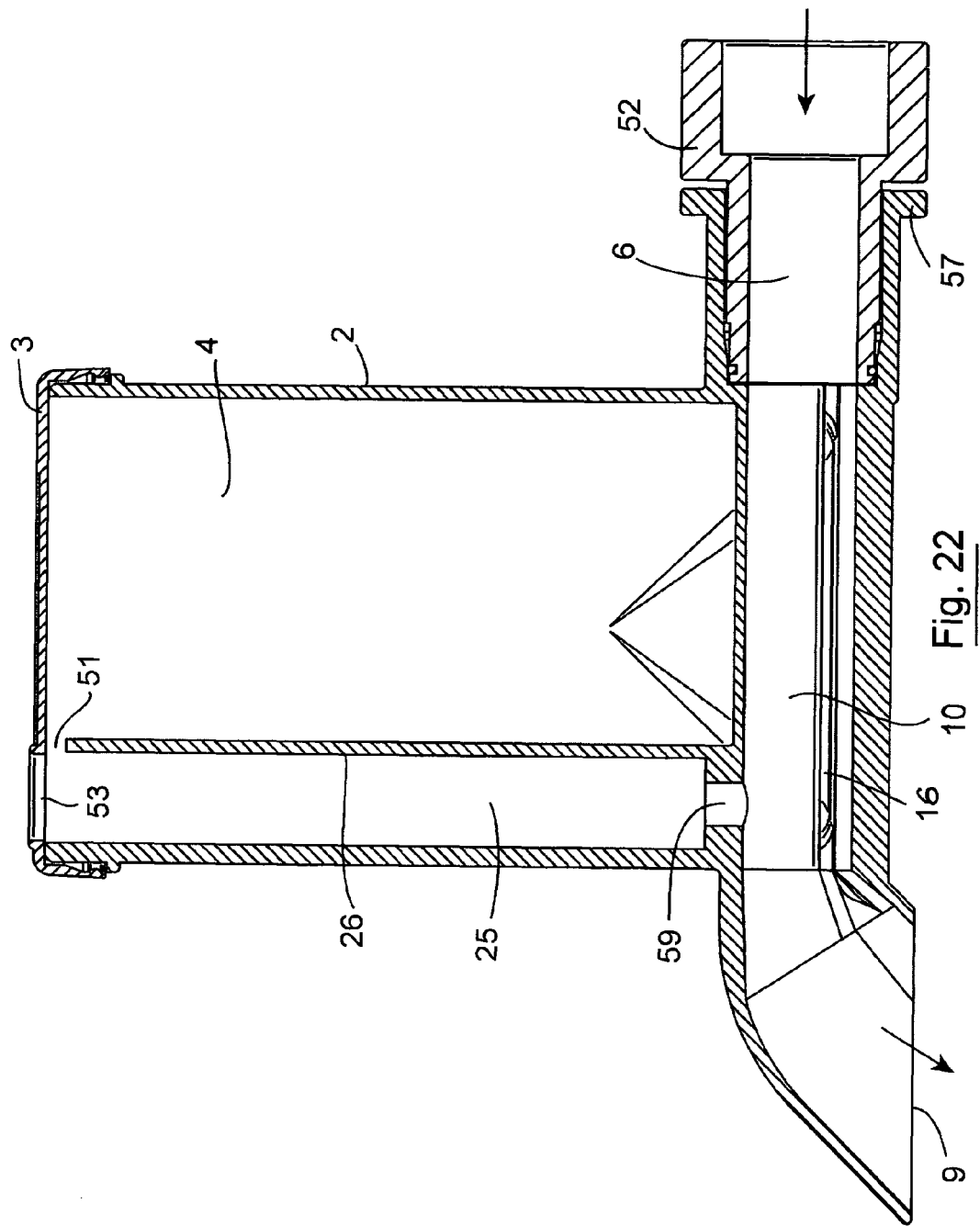
FIG. 22 is a cross sectional view on the line XXII-XXII in FIG. 20.

FIGS. 14 and 15 illustrate the device with the adjustment screw 15 in an extended position of use. In this configuration the hold up of water in the container is increased. The water is typically at a level 18 which provides an increased pressure head Ah which increases the take-up of chlorine in the water.

For example, for an inlet flow of 2 L/min of water at a temperature of 28° C. when the screw is fully retracted the device of FIGS. 7 to 11 with tablets as described above added 0.5 ppm chlorine to the outlet water. When the screw is fully extended the chlorine addition increased to 2.6 ppm.

Referring to FIGS. 16 to 22 there is illustrated another chlorination device 50 according to the invention. Parts similar to those identified with reference to previous drawings are assigned the same reference numerals. The device is again un-pressurised and a small hole 51 is provided at hole 53 screw access the top of the dividing wall 26 to ensure that the chamber 4 is open to atmospheric pressure when the lid 3 is fitted. In this case the lid 3 is not necessarily a loose fit and the container may be pre-loaded with chlorination tablets. An adjustment screw 15 (not illustrated in this embodiment) is housed in a hole 59 at the bottom of the access chamber 25. The top of the access chamber 25 is open at 53 to provide access for the adjustment for an implement such as a screwdriver to adjust the screw 15.

In this case the inlet to the device has a quick release and easy fitting spigot 52 and socket 57 arrangement. In the embodiment illustrated the fitting is of a bayonet type and the spigot has protrusions 55 which interengage with bayonet grooves 56 in the socket 57.

Figure 23:
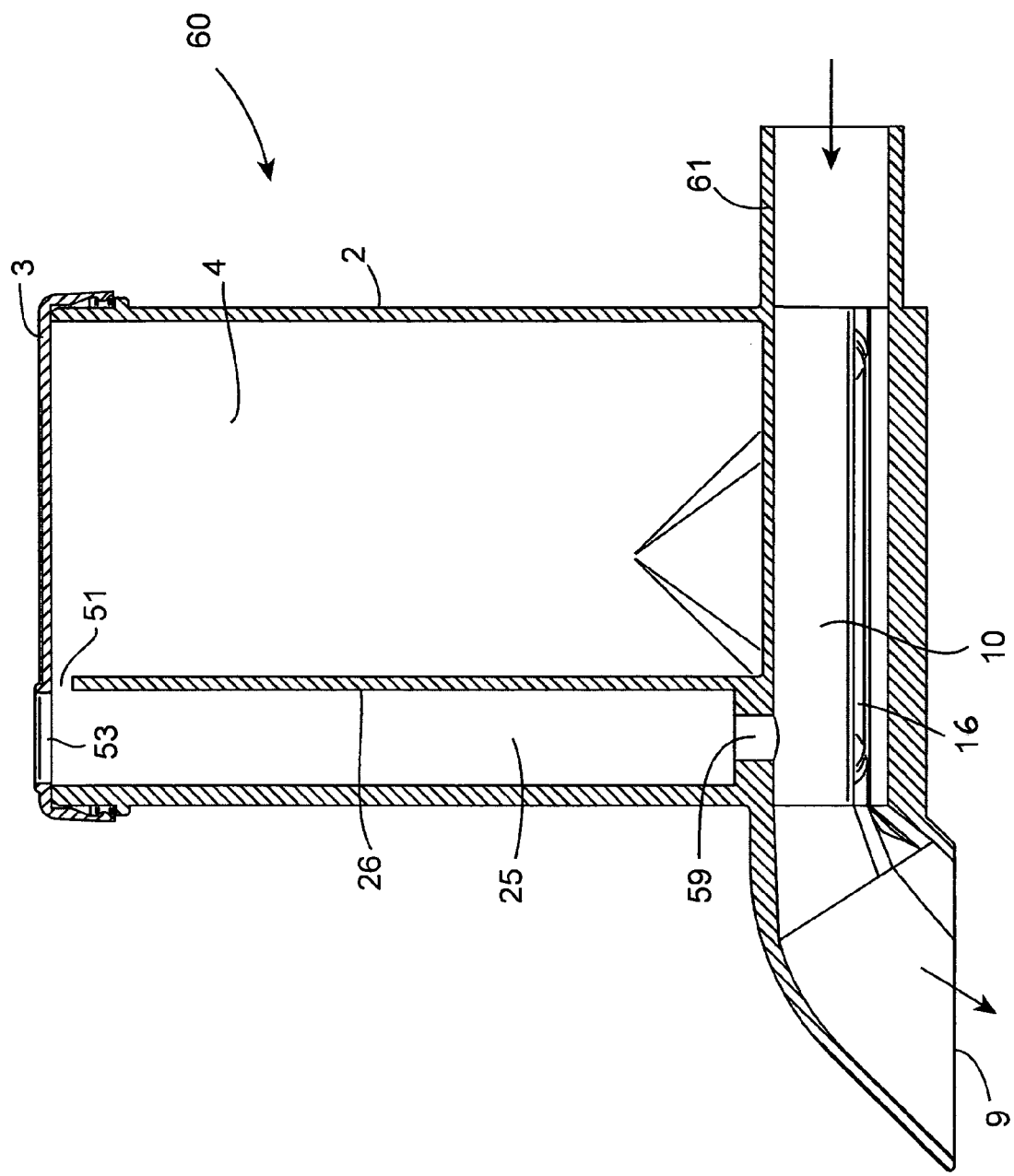
FIG. 23 is a cross sectional view of another device according to the invention.

Referring to FIG. 23 there is illustrated another chlorination device 60 according to the invention in which parts similar to those in other embodiments are again assigned the same reference numerals. In this case an inlet 61 is a plain end spigot to which an inlet supply pipe can be readily fitted, for example by using a jubilee clip or the like.

It will be appreciated that features of the various embodiments may be used as appropriate with other embodiments described. For example, the obstruction/restrictor may be located in any suitable position. Similarly, the various devices of FIGS. 11 to 24 may have a reducing cross-sectional area higher in the device as described with reference to FIGS. 1 to 4.

The device of the invention may be generally referred to as a chlorination device. However, the device can be used for any suitable end-of-line applications for the controlled erosion of solid tablets or the like. The device may be a water sanitising unit in which case the tablets may contain a disinfectant such as a source of chlorine and/or bromine.

The invention is not limited to the embodiments hereinbefore described, with reference to the accompanying drawings, which may be varied in construction and detail.

The invention claimed is:

1. A device for dissolving, dispersing and dispensing soluble material in a solid form into a liquid flowing through the device, the device comprising
    a container having a top and a bottom, and an inlet and an outlet at the bottom of the container,
    a pipe formed inside and integrally with the bottom of the container and extending from the inlet to the outlet along the bottom of the container,
    the container being configured to house tablets in contact with the bottom of the container and the pipe,
    the pipe having at least one opening, the at least one opening comprises an elongate opening extending longitudinally along the wall of the pipe substantially from the inlet to the outlet, the at least one opening configured to:
    a) allow some of the liquid flowing through the pipe from the inlet to the outlet to contact the tablets housed in the container; and
    b) allow all of the liquid to completely drain from the device when there is no liquid flowing through the device, and
    the container having a vent to atmosphere.

2. The device as claimed in claim 1 comprising an adjustable obstruction for adjustment of the amount of material dissolved in water flowing through the device.

3. The device as claimed in claim 2 wherein the obstruction is movable from a retracted position in which the obstruction does not obstruct the flowpath through the pipe and an extended position in which the obstruction extends into the flowpath through the pipe to partially obstruct the flowpath.

4. The device as claimed in claim 3 wherein the obstruction is rotatably mounted for movement between retracted and extended configurations.

5. The device as claimed in claim 4 wherein the obstruction comprises a screw which is rotatably mounted in a wall of the pipe.

6. The device as claimed in claim 2 wherein the device comprises an access housing for accessing the obstruction.

7. The device as claimed in claim 6 wherein the access housing extends through the container.

8. The device as claimed in claim 6 wherein the container comprises a chamber for reception of tablets, the chamber being separated from the access housing by a dividing wall.

9. The device as claimed in claim 8 wherein there is an opening between the dividing wall and the top of the chamber to maintain the chamber at atmospheric pressure.

10. The device as claimed in claim 1 wherein the inlet and outlet are arranged substantially co-axially.

11. The device as claimed in claim 1 wherein the vent is a top opening that is covered by a loose fitting lid.

12. The device as claimed in claim 1 wherein the inlet is adapted for coupling with a water supply pipe.

13. The device as claimed in claim 1 wherein the cross sectional area of the container at a lower part of the device is less than a cross sectional area at an upper part of the device.

14. The device as claimed in claim 1 wherein the outlet is downwardly directed.

15. The device as claimed in claim 14 wherein the outlet comprises an expansion.

16. The device as claimed in claim 14 wherein the outlet has a deflecting wall.

17. The device as claimed in claim 16 wherein the angle subtended between the deflecting wall and the vertical is approximately 45°.

18. The device as claimed in claim 14 wherein the outlet is integral with the container.

19. The device as claimed in claim 1 wherein the tablet contains a source of chlorine.

20. The device according as claimed in claim 1, wherein the pipe is integrally molded with the container.

* * * * *